Figure 1:
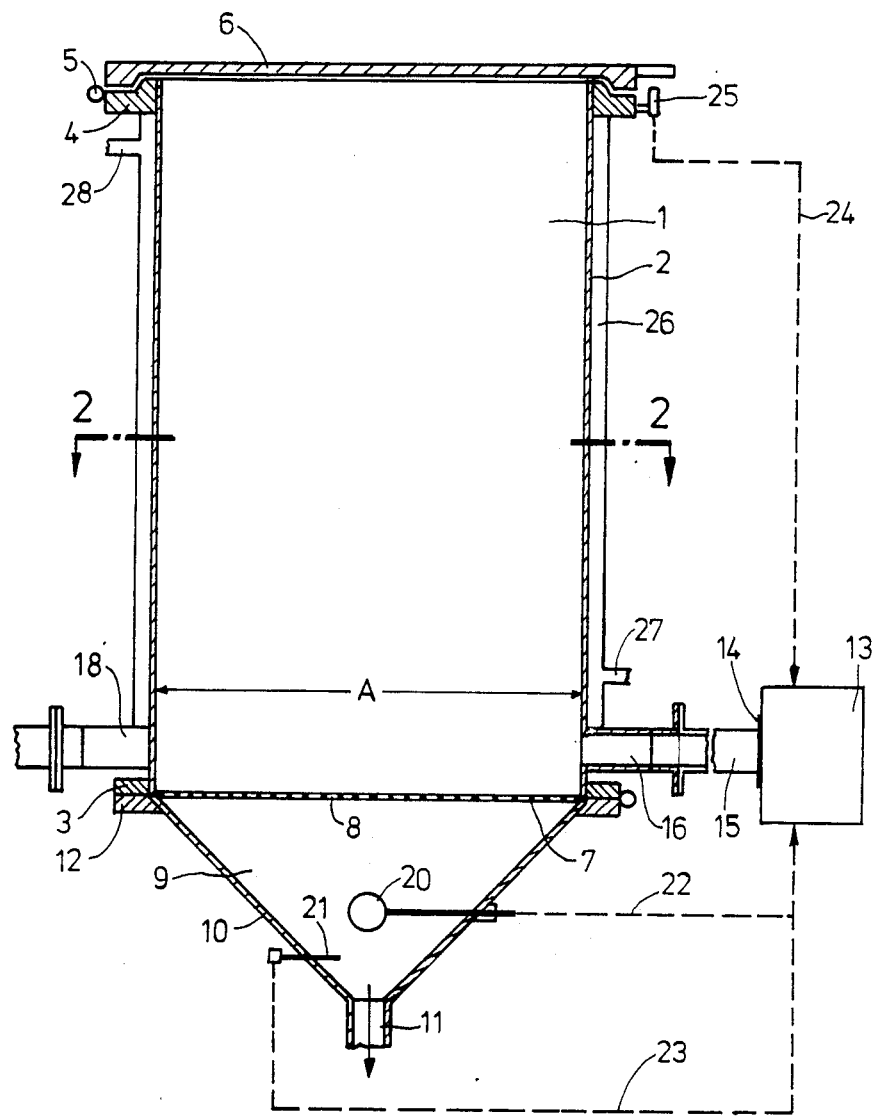

United States Patent [19]

Koepke et al.

[11] Patent Number: 4,673,782
[45] Date of Patent: Jun. 16, 1987

[54] PROCESS AND APPARATUS FOR MICROWAVE MELTING SOLIDIFIED GEL MASSES, IN PARTICULAR OF PHOTOGRAPHIC EMULSIONS

[75] Inventors: Günther Koepke; Hans Frenken, both of Odenthal; Josef Friedsam, Langenfeld, all of Fed. Rep. of Germany

[73] Assignee: Agfa Gevaert Aktiengesellschaft, Leverkusen, Fed. Rep. of Germany

[21] Appl. No.: 771,649

[22] Filed: Sep. 3, 1985

[30] Foreign Application Priority Data

Sep. 13, 1984 [DE] Fed. Rep. of Germany ....... 3433580

[51] Int. Cl.$^4$ .............................................. H05B 6/78
[52] U.S. Cl. ................... 219/10.55 M; 219/10.51 A; 219/10.55 E; 219/10.55 D
[58] Field of Search ................ 219/10.55 M, 10.55 F, 219/10.55 A, 10.55 R, 10.55 E, 10.55 D

[56] References Cited

U.S. PATENT DOCUMENTS

| | | | |
|---|---|---|---|
| 3,336,142 | 8/1967 | Lawson | 219/10.55 A X |
| 3,845,270 | 10/1974 | Widugris, Jr. | 219/10.55 R |
| 4,004,122 | 1/1977 | Hallier | 219/10.55 F |

FOREIGN PATENT DOCUMENTS 55-67326  5/1980  Japan ........................... 219/10.55 A Primary Examiner—Philip H. Leung
Attorney, Agent, or Firm—Connolly and Hutz

[57] ABSTRACT

A process and an apparatus for melting solidified gel masses, in particular of photographic emulsions, which are introduced as solid pieces of any size or shape into a melting container having a perforated bottom and equipped with a tempering device, the gel mass when melted flowing through the openings in the bottom into a receiver underneath it, and being arranged and designed to prevent excessive exposure of the gel mass to heat. This is achieved by melting the layer of gel mass immediately above the bottom of the melting container with microwaves while the layers of gel mass situated above the aforesaid layer remain substantially uninfluenced by the radiation of microwaves.

13 Claims, 3 Drawing Figures

PROCESS AND APPARATUS FOR MICROWAVE MELTING SOLIDIFIED GEL MASSES, IN PARTICULAR OF PHOTOGRAPHIC EMULSIONS

This invention relates to a process and an apparatus for melting solidified gel masses, in particular of photographic emulsions, which are introduced as solid pieces of any size or shape into a melting container equipped with a tempering device and having openings in the bottom. When the gel mass has melted, it flows through the openings in the bottom into a receiver arranged underneath the container.

The conventional apparatus used for this purpose was a melting tank consisting of a container with stirrer and a heating jacket. The material to be melted was introduced into the container and heated with stirring, the heat being supplied from the heating jacket which was filled for this purpose with a suitable heat transfer medium, preferably steam or hot water. The transfer of heat from heat transfer medium to the material to be melted was effected by convection alone. In order to achieve satisfactory heat transfer, it was necessary to keep the entire solidified mass in motion by means of a high power stirrer mechanism with considerable expenditure of energy. The energy expenditure was all the higher on account of the fact that for delicate materials such as photographic emulsions and foodstuffs, for example, it was necessary to use a container manufactured from refined steel, which has a very low coefficient of thermal conductivity.

Even if the process was carried out under optimum conditions, the effects on the product to be melted gave rise to serious problems. If the melting time was required to be short, it was necessary to apply a steep temperature gradient from the container wall to the material to be melted. This subjected the material to unacceptable thermal stresses which in the case of photographic emulsions, for example, resulted in the formation of streaks in the material and affected the sensitization. If, on the other hand, the temperature of the heating jacket was kept equal or close to the final temperature of the liquefied product in order to keep the temperature gradient small, it was necessary to keep the product at this temperature for a longer time. In photographic emulsions, this can result in after-digestion and hence changes in the photographic properties. Moreover, efficient use of energy could only be achieved if the process was carried out batchwise.

It is known from DE-OS No. 2 432 556 to melt photographic emulsions either batchwise or continuously by means of a heating grate placed in the melting vessel. A uniform rate of melting, however, can only be achieved in such an arrangement if the solidified emulsion has been broken down to relatively small pieces in order to prevent the formation of large cavities between individual pieces of the emulsion as this would result in uneven exposure to heat of the heat exchange surface.

A similar problem arises in the melting apparatus with inclined heating grates disclosed in DD-PS No. 158 529, but with the added risk that the molten emulsion is liable to adhere temporarily to the heating grate before being discharged and is therefore liable to get heated to the temperature of the grate. This could cause serious overheating of the emulsion, with all the disadvantages described above.

It is an object of the present invention to arrange a process and an apparatus of the type mentioned above in such a manner that the solidified material to be melted can be supplied in the form of pieces of any size or shape and yet the thermal stress on the material will remain extremely low even in a continuous process.

This problem is solved according to the invention by the features of the main claim. Other advantageous features of the invention will be found in the sub-claims.

Due to the fact that the microwave energy used for the melting process is concentrated on the lowermost layer in the melting container and this energy penetrates the unmolten material to a depth of only about 10 mm, the advantageous effect is obtained that the thermal stress on the material during the melting process is extremely low.

The molten material is neither overheated nor does it remain too long in the energy zone of the melting apparatus.

Further advantages will be apparent from the description of the invention given below.

Figure 2:
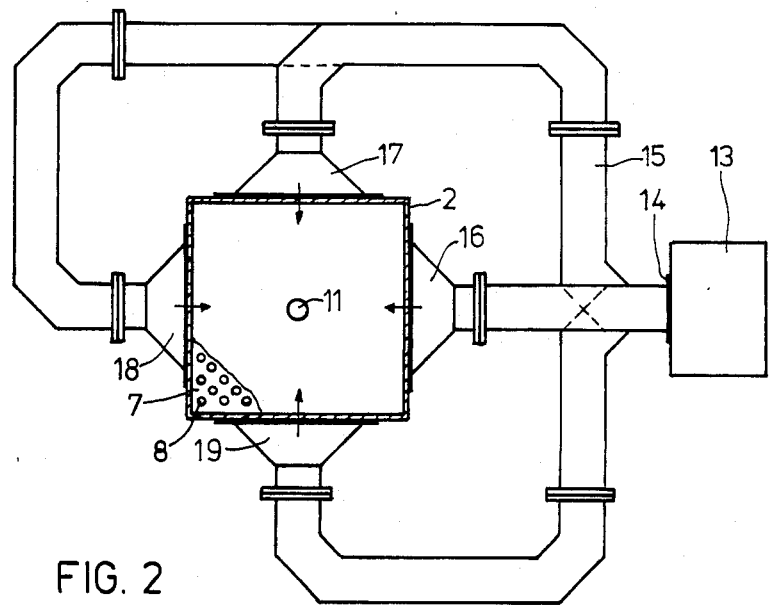
Figure 3:
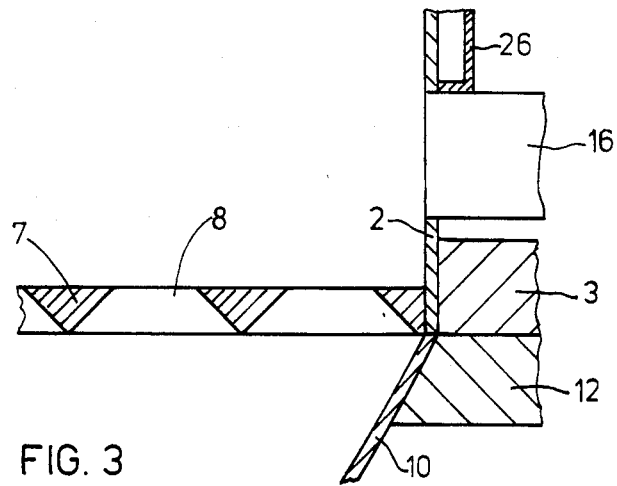

An embodiment of the invention is described in more detail below with reference to the drawings, in which FIG. 1 is a longitudinal section through the melting apparatus according to the invention, FIG. 2 is a section taken on the line 2—2 of FIG. 1 drawn to a reduced scale, and FIG. 3 shows a portion of FIG. 1 on an enlarged scale.

The melting container 1 shown in the accompanying drawings is square in cross-section. Its walls 2 are made of refined steel. The container has a bottom flange 3 and a top flange 4 on which a lid 6 is pivotally mounted by means of the hinge 5. A perforated plate 7 functioning as a grate is inserted at the lower end of the melting container and rigidly connected to the container walls 2, preferably by welding. The perforated plate 7 is manufactured from VA steel and has a plurality of openings or bores 8 distributed over its whole surface area and arranged close together in staggered formation. As may be seen from FIG. 3, the openings are countersunk to widen out conically towards the bottom so that they form sharp edges with acute angles at the upper surface. The diameter of the individual bores is preferably from 4 to 10 mm on the upper surface of the plate.

Situated underneath the melting container 1 is a receiver 9 having walls 10 tapering downwards to form a funnel opening into a discharge pipe 11 which is only partly shown in FIG. 1. The receiver 9 is attached to the bottom flange 3 of the melting container 1 by means of a flange 12.

The lowermost layer of the photographic emulsion or other aqueous mass which has been introduced into the container 1 in the solidified state, in the form of lumps or the like, is melted by means of a microwave generator 13. This may consist of an ordinary commercial magnetron emitting microwaves with a wavelength of, for example, 122.4 mm.

The microwave output 14 of the generator 13 is attached to short connecting elements 16, 17, 18,19 by a system of branched wave guides 15. These connecting elements are attached to the melting container 1 at a short distance above the perforated plate 7, one in each of the four walls 2 of the container so that they are arranged in pairs facing each other. If required, however, each side of the melting container 1 could be provided with several such connecting elements for the introduction of microwaves into the container. Moreover, instead of providing only one microwave generator 13, several such generators could be provided and connected to the individual connecting elements. The important feature to be observed is that the connecting elements should all be set into the walls 2 of the container 1 at about the same height.

The wave guides 15 are rectangular in cross-section with the shorter sides of the rectangle perpendicular to the plane of the perforated plate 7.

The receiver 9 contains a level sensing device 20 and a temperature probe 21 and is connected to the microwave generator 13 by electric leads 22,23 to control the flow of energy from the generator. This can be achieved either by periodically switching the generator on and off or by altering the output of the generator, or by a combination of the two methods.

Apart from this method of control, the microwave generator 13 is also equipped for safety reasons to be switched off by an approximation initiator 25 through the electric connection 24 when the lid 6 is opened.

The length of side A of the melting container and the wavelengths of the microwaves from the microwave generator 13 are so adjusted to each other that the length A is an integral multiple of half the wavelength of the microwaves.

The zone of the melting container 1 situated above the connecting elements 16,17,18,19 is surrounded on the outside by a cooling jacket 26. Connecting pieces 27,28 are provided for the supply and removal of the cooling agent.

The process according to the invention operates as follows:

When the lid 6 has been opened, and has thereby switched off the microwave generator 13 by way of the approximation initiator 25, the photographic emulsion which has solidified in the form of lumps, slabs or the like, is introduced into the container 1. The solid emulsion lies on the perforated plate 7 and is stacked in the container to a height reaching at the most to the level of the top flange 4. When the lid 6 has been closed, the microwave generator 13 switches on. The microwaves emitted from the generator are carried by the wave guide system 15 to the connecting elements 16,17,18 and 19 and enter the lower layer of the material, immediately above the perforated plate 7, in the direction of the arrows shown in FIG. 2. The height of this lowermost layer is determined approximately by the height of the connecting elements 16,17,18,19. The microwave energy penetrates the mass of the material to a depth of about 10 mm and raises the temperature of the material at the most to its melting point, in the case of photographic emulsions to a temperature in the range of about 37° C. to 40° C. The molten portions of material then flow from the surface of the individual lumps of material to pass through the openings 8 in the perforated plate 7 into the receiver 9 to be discharged through the pipe 11 and conducted by way of a valve or pump (not shown) to the particular consuming device. When the material being melted is a photographic emulsion, the consuming device is normally a casting apparatus for casting photographic layers.

When the microwave generator 13 has been switched on, melting of the layer of material above the perforated plate 7 is at first localized to the regions close to the connecting elements 16,17,18,19 but the melting process spreads from there in the form of waves. The melting process forms tunnels in the stack of solid lumps of material, and these tunnels periodically collapse under the weight of the layers of material above them, and when the material has subsided, fresh tunnels are formed.

Since the distance between the openings 8 in the perforated plate 7 are designed only to be large enough to enable the plate to support the weight of the material stacked on it, damming up of molten emulsion and prolonged dwell times in the zone of microwave energy do not occur and excessive rises in temperature are therefore prevented. Furthermore, the conical shape of the openings 8 in the perforated plate 7 and the consequent formation of acute angles at the top edges of the portions of solid plate 7 remaining between the openings 8 ensure that the molten material will not linger on the plate and thereby get overheated. At the same time, the perforated plate 7 effectively shields the receiver 9 against the microwave energy so that molten material in the receiver is already outside the zone of microwave energy.

At the same time, the arrangement of the connecting element 16,17,18,19 also prevents the supply of microwave energy reaching higher than about the level of these connecting elements. This ensures that only the material situated in this zone will absorb energy and be heated and melt while the material in the layers above this zone will remain solid and virtually unheated until it slips by subsidence into the energy zone situated in the layer determined by the height of the connecting elements 16,17,18 and 19.

If emulsions are particularly sensitive to temperature, the layers of reserve material above the zone of microwave energy can be kept at the desired temperature by the cooling jacket 26.

For a continuous operation, the rate of melting is controlled by means of the level sensing device 20 and temperature probe 21 in dependence upon the requirements of the consuming device connected to the discharge pipe 11.

The process according to the invention ensures that no particle of product to be melted is heated significantly above the melting temperature. At the same time, the dwell time of the material in the melting zone is extremely short.

The process according to the invention and the apparatus according to the invention are suitable not only for melting photographic emulsions but also for melting other aqueous products and gel masses, e.g. in the foodstuffs industry.

We claim:

1. A process for melting, by microwaves, solidified gel masses which are introduced as solid pieces of any shape or form into a melting container equipped with microwave generating means and having a bottom with openings, gel mass flowing, after it has melted, through the openings of the bottom into a receiver underneath it, wherein the improvement comprises directing and restricting the microwaves to a zone of effectiveness of the microwaves, which zone is interposed between zones above and below the zone of effectiveness, the zone above the zones of effectiveness is within the container and the zone below the zone of effectiveness is below the bottom with openings, directing the microwaves only to the ground layer of gel mass situated in said zone of effectiveness above and close to the bottom of the melting container, shielding the receiver against microwaves by a bottom capable of preventing microwave energy from penetrating into said receiver, and controlling the flow of energy from the generator producing the microwaves in dependence upon the quantity of melt discharged from the receiver or in dependence upon the temperature of the melt in the receiver.

2. A process according to claim 1, characterised in that the microwaves are transmitted to the zone of effectiveness and the ground layer by means of energy conductors extending substantially parallel to the bottom of the melting container and close to material of the ground layer of the gel mass.

3. Process according to claim 2, characterised in that the microwaves are transmitted to the melting layer from several sides.

4. Process according to claim 3, characterised in that the microwaves are transmitted to the melting layer from opposite sides.

5. A device for melting solidified gel masses comprising a container adapted to receive solid gel masses; a plate positioned across the bottom of the container adapted to support said solid gel masses in said container; apertures formed in said plate in proximity to each other distributed across the plane of the plate; a receiver located beneath said plate for collecting melted material flown through said apertures; means for generating microwave energy; energy conductor means associated with the container adapted to conduct microwave energy to said container; and means to control the flow of energy from the generator producing the microwaves in dependence upon the quantity of melt discharged from the receiver or in dependence upon the temperature of the melt in the receiver; whereas said energy conductor means terminates just above said plate, and said plate being capable of preventing microwave energy from penetrating into said receiver.

6. Apparatus according to claim 5, characterised in that the energy conductors open into the melting container from opposite sides.

7. Apparatus according to claim 6, characterised in that the energy conductors consist of rectangular wave guides (15) the shorter sides of which are perpendicular to the plane of the bottom of the melting container (1).

8. Appparatus according to claim 7, characterised in that connecting pieces (16,17,18,19) connected to the microwave generator (13) are set into the walls (2) of the melting container (1) at about the same height.

9. Apparatus according to claim 8, characterised in that the melting container has a cooling jacket (26) in the region above the melting layer.

10. A device according to claim 5 wherein said plate is made of metal.

11. Apparatus according to claim 10, characterised in that the openings (8) in the perforated plate (7) have a diameter of 4 to 10 mm and are arranged in staggered formation with narrow webs between them.

12. Apparatus according to claim 11, characterised in that the openings in the perforated plate (7) widen out, preferably conically, in the direction of a receiver (9) arranged underneath it.

13. A device according to claim 5 wherein the melting container is rectangular and the length of its sides is an integral multiple of half the wavelength of the microwaves employed.

* * * * *